(12) United States Patent
Andoh et al.

(10) Patent No.: US 6,264,819 B1
(45) Date of Patent: Jul. 24, 2001

(54) METHOD FOR PRODUCING POLYSULFIDE BY ELECTROLYTIC OXIDATION

(75) Inventors: Tatsuya Andoh; Junji Tanaka; Tetsuji Shimohira, all of Kanagawa (JP)

(73) Assignees: Asahi Glass Company Ltd.; Kawasaki Kasei Chemicals Ltd.; Nippon Paper Industries Co., Ltd., all of Tokyo (JP)

( * ) Notice: Subject to any disclaimer, the term of this patent is extended or adjusted under 35 U.S.C. 154(b) by 0 days.

(21) Appl. No.: 09/463,581
(22) PCT Filed: May 27, 1999
(86) PCT No.: PCT/JP99/02786
§ 371 Date: Jan. 28, 2000
§ 102(e) Date: Jan. 28, 2000
(87) PCT Pub. No.: WO99/62818
PCT Pub. Date: Dec. 9, 1999

(30) Foreign Application Priority Data

May 29, 1998 (JP) .................................................. 10-166374

(51) Int. Cl.$^7$ ............................... C25B 1/00; C01B 17/18
(52) U.S. Cl. .......................... 205/494; 205/554; 205/746; 423/562
(58) Field of Search .................................. 205/494, 554, 205/746; 423/562

(56) References Cited

U.S. PATENT DOCUMENTS

| 5,624,545 | * | 4/1997 | Landfors et al. | 205/746 |
| 5,972,197 | * | 10/1999 | Andoh et al. | 205/554 |

FOREIGN PATENT DOCUMENTS

| 8-284089 | 10/1996 | (JP) . |
| 8-512099 | 12/1996 | (JP) . |
| WO 95/00701 | 1/1995 | (WO) . |
| WO 97/41295 | 11/1997 | (WO) . |

\* cited by examiner

*Primary Examiner*—Arun S. Phasge
(74) *Attorney, Agent, or Firm*—Oblon, Spivak, McClelland, Maier & Neustadt, P.C.

(57) ABSTRACT

It is an object of the present invention to produce a cooking liquor containing polysulfide sulfur at a high concentration from white liquor in a pulp production process with a high selectivity at a low electric power with very little production of thiosulfate ions as by-product. The present invention provides a method for producing polysulfides, which comprises introducing a solution containing sulfide ions into an anode compartment of an electrolytic cell comprising the anode compartment provided with a porous anode, a cathode compartment provided with a cathode and a diaphragm partitioning the anode compartment and the cathode compartment, for electrolytic oxidation to obtain polysulfide ions, wherein at least the surface of said anode is made of nickel, and the porous anode has a physically continuous three-dimensional network structure.

18 Claims, No Drawings

METHOD FOR PRODUCING POLYSULFIDE BY ELECTROLYTIC OXIDATION

This application is a 371 of PCT/JP99/02786 filed May 27, 1999.

TECHNICAL FIELD

The present invention relates to a method for producing polysulfides by electrolytic oxidation. Particularly, it relates to a method for producing a polysulfide cooking liquor by electrolytically oxidizing white liquor or green liquor in a pulp production process.

BACKGROUND ART

It is important to increase the yield of chemical pulp for effective utilization of wood resources. A polysulfide cooking process is one of techniques to increase the yield of kraft pulp as the most common type of chemical pulp.

The cooking liquor for the polysulfide cooking process is produced by oxidizing an alkaline aqueous solution containing sodium sulfide, i.e. so-called white liquor, by molecular oxygen such as air in the presence of a catalyst such as activated carbon (e.g. reaction formula 1) (JP-A-61-259754 and JP-A-53-92981). By this method, a polysulfide cooking liquor having a polysulfide sulfur concentration of about 5 g/l can be obtained at a selectivity of about 60% and a conversion of 60% based on the sulfide ions. However, by this method, thiosulfate ions not useful for cooking, are likely to form by side reactions (e.g. reaction formulae 2 and 3), whereby it used to be difficult to produce a cooking liquor containing polysulfide sulfur at a high concentration with a high selectivity.

$$4Na_2S+O_2+2H_2O \rightarrow 2Na_2S_2+4NaOH \quad (1)$$

$$2Na_2S+2O_2+H_2O \rightarrow Na_2S_2O_3+2NaOH \quad (2)$$

$$2Na_2S_2+3O_2 \rightarrow 2Na_2S_2O_3 \quad (3)$$

Here, polysulfide sulfur which may also be referred to as PS-S, is meant for sulfur of 0 valency in e.g. sodium polysulfide $Na_2Sx$, i.e. sulfur of (x-1) atoms. Further, in the present specification, sulfur corresponding to sulfur having oxidation number of −2 in the polysulfide ions (sulfur of one atom per $Sx^{2-}$) and sulfide ions ($S^{2-}$) will generically be referred to as $Na_2S$-state sulfur. In the present specification, the unit liter for the volume will be represented by l.

On the other hand, PCT International Publication WO95/00701 discloses a method for electrolytically producing a polysulfide cooking liquor. In this method, as an anode, a substrate surface-coated with a oxide of ruthenium, iridium, platinum or palladium, is used. Specifically, a three-dimensional mesh electrode composed of a plurality of expanded-metals is disclosed. Further, WO97/41295 discloses a method for electrolytically producing a polysulfide cooking liquor by the present inventors. In this method, as the anode, a porous anode at least made of carbon is used, particularly an integrated body of carbon fibers having a diameter of from 1 to 300 μm is used.

It is an object of the present invention to obtain polysulfides at a high concentration by an electrolytic method from sulfide ions in a solution, particularly to produce a cooking liquor containing polysulfide sulfur at a high concentration from white liquor in a pulp production process at a high selectivity with a low electrolytic power while minimizing by-production of thiosulfate ions. Further, it is an object of the present invention to provide a method for producing a polysulfide cooking liquor under such a condition for the electrolysis operation that the pressure loss is small.

DISCLOSURE OF THE INVENTION

The present invention provides a method for producing polysulfides, which comprises introducing a solution containing sulfide ions into an anode compartment of an electrolytic cell comprising the anode compartment provided with a porous anode, a cathode compartment provided with a cathode and a diaphragm partitioning the anode compartment and the cathode compartment, for electrolytic oxidation to obtain polysulfide ions, wherein at least the surface of said anode is made of nickel or a nickel alloy containing nickel in an amount of at least 50 wt %, the porous anode has a physically continuous three-dimensional network structure, and the surface area of the anode per unit volume of the anode compartment is from 500 to 20000 $m^2/m^3$.

BEST MODE FOR CARRYING OUT THE INVENTION

In the present invention, the anode compartment is provided with a porous anode, of which at least the surface is made of nickel or a nickel alloy containing nickel in an amount of at least 50 wt %, which has a physically continuous three-dimensional network structure, and which has a surface area of from 500 to 20000 $m^2/m^3$ per unit volume of the anode compartment. Since at least surface portion of the anode is made of nickel or a nickel alloy, a practically adequate durability can be obtained in the production of polysulfides. Nickel can be available at a relatively low cost, and the elution potential and the formation potentials of its oxide are is higher than the formation potentials of polysulfide sulfur and thiosulfate ions, whereby it is suitable as an electrode material to obtain polysulfide ions by electrolytic oxidation. The surface of the anode in the present invention is preferably made of nickel, and a nickel alloy containing nickel in an amount of at least 50 wt % may be used. More preferably the nickel alloy has a nickel content of at least 80 wt %.

Further, the anode is porous and has a three-dimensional network structure, whereby it has a large surface area, and accordingly when it is used as the anode, the desired electrolytic reaction will take place over the entire surface of the electrode thereby to suppress formation of by-products. Further, said anode is not an integrated body of fibers, but has a physically continuous network structure, whereby it exhibits adequate electrical conductivity as the anode, and IR drop at the anode can be reduced, and accordingly the cell voltage can further be decreased. Further, since the anode has good electrical conductivity, the porosity of the anode can be made high, whereby pressure loss can be decreased.

In the present invention, the surface area of the anode per unit volume of the anode compartment is required to be from 500 to 20000 $m^2/m^3$. Here, the volume of the anode compartment is represented by the volume of a portion partitioned by the effective current-carrying surface of the diaphragm and a current-collecting plate of the anode. If the surface area of the anode is smaller than 500 $m^2/m^3$, the current density at the anode surface tends to be high, whereby not only by-products such as thiosulfate ions are likely to form, but also nickel is likely to undergo anode dissolution, such being undesirable. If the surface area of the anode is larger than 20000 $m^2/m^3$, there are possible problems in the electrolysis operation such that the pressure loss of the liquid may increase, such being undesirable. The surface area of the anode per unit volume of the anode compartment is more preferably within a range of from 1000 to 10000 m²/m³.

Further, the surface area of the anode is preferably from 2 to 100 m²/m² per unit area of the diaphragm partitioning the anode compartment and the cathode compartment. The surface area of the anode is more preferably from 5 to 50 m²/m² per unit area of said diaphragm. The anode is required to be made of nickel or a nickel alloy at least at its surface, and the entire anode may be made of nickel or a nickel alloy. Further, the anode has a physically continuous three-dimensional network structure, and forms a porous structure. The network structure is a physically continuous structure, and may be continuously bonded by e.g. welding. Concretely, porous nickel obtained in such a manner that nickel is plated on the skeleton of a foam high molecular material, and the high molecular material in the inside is removed by calcinations, may be mentioned.

Pores in the anode has an average pore size of preferably from 0.1 to 5 mm. If the average pore size of the pores is larger than 5 mm, the surface area of the anode can not be made large, whereby the current density at the anode surface tends to be high, and accordingly, not only by-products such as thiosulfate ions are likely to form, but also nickel is likely to undergo anode dissolution, such being undesirable. If the average pore size of the pores is smaller than 0.1 mm, there are possible problems in the electrolysis operation such that the pressure loss of the liquid may increase, such being undesirable. The average pore size of the pores in the anode is more preferably from 0.2 to 2 mm.

With respect to the anode having a three-dimensional network structure of the present invention, the diameter of the filament material constituting the network structure is preferably from 0.01 to 2 mm. A filament material having a diameter of less than 0.01 mm is difficult to produce and costly and not easy to handle. If the diameter of the filament material exceeds 2 mm, it tends to be difficult to obtain an anode having a large surface area, and the current density at the anode surface tends to be high, whereby by-products such as thiosulfate ions are likely to form, such being undesirable. The diameter of the filament material constituting the network structure is particularly preferably from 0.02 to 1 mm.

In the present invention, the anode may be disposed fully in the anode compartment so that it is in contact with the diaphragm, or it may be disposed in the anode compartment so that some space remains between the anode and the diaphragm. Since it is necessary that the liquid to be treated will pass through the anode, preferably the anode has a sufficient porosity. In all cases, the porosity of the anode is preferably from 90 to 99%. If the porosity is less than 90%, the pressure loss at the anode tends to be high, such being undesirable. If the porosity exceeds 99%, it tends to be difficult to obtain a large anode surface area, such being undesirable. The porosity is particularly preferably from 90 to 98%.

It is preferred that the operation is carried out at a current density of from 0.5 to 20 kA/m² at the diaphragm area. If the current density at the diaphragm area is less than 0.5 kA/m², an unnecessarily large installation for electrolysis will be required, such being undesirable. If the current density at the diaphragm area exceeds 20 kA/m², not only by-products such as thiosulfuric acid, sulfuric acid and oxygen may increase, but also nickel may undergo anode dissolution, such being undesirable. More preferably, the current density at the diaphragm area is from 2 to 15 kA/m². In the present invention, an anode having a large surface area relative to the area of the diaphragm is employed, whereby the operation can be carried out within a range where the current density at the anode surface is low.

The anode of the present invention has a large surface area, whereby the current density at the anode surface can be made small. Presuming that the current density is uniform over the entire surface of the anode, if the current density at the anode surface is calculated from the surface area of the anode, the calculated current density is preferably from 5 to 3000 A/m². More preferred range is from 10 to 1500 A/m². If the current density at the anode surface is less than 5 A/m², an unnecessarily large installation for electrolysis will be required, such being undesirable. If the current density at the anode surface exceeds 3000 A/m², not only by-products such as thiosulfuric acid, sulfuric acid and oxygen may increase, but also nickel may undergo anode dissolution, such being undesirable.

In the present invention, the anode is not an integrated body of fibers, but has a physically continuous network structure, and exhibits adequate electrical conductivity, whereby the porosity of the lo anode can be made high, while maintaining IR drop at the anode small. Accordingly, the pressure loss of the anode can be reduced.

It is preferred to maintain the liquid current in the anode compartment to a laminar flow region having a low flow rate, to minimize the pressure loss. However, the anode solution in the anode compartment will not be stirred at the laminar flow, and in some cases, precipitates are likely to deposit on the diaphragm facing the anode compartment, whereby the cell voltage tends to increase with time. In the present invention, the pressure loss of the anode can be maintained small, even when the anode solution flow rate is set high, and accordingly the anode solution close to the surface of the diaphragm will be stirred, and precipitates are less likely to deposit on the diaphragm, such being advantageous. The average superficial velocity in the anode compartment is preferably from 1 to 30 cm/sec. The flow rate of the cathode solution is not particularly limited and is determined depending upon the degree of buoyancy of the generated gas. The average superficial velocity in the anode compartment is more preferably within a range of from 1 to 15 cm/sec, particularly preferably within a range of from 2 to 10 cm/sec.

An electric current is supplied to the anode through an anode current collector. The material for the current collector is preferably a material excellent in alkali resistance. For example, nickel, titanium, carbon, gold, platinum or stainless steel may be employed. The surface of the current collector may be flat. It may be designed to supply an electric current simply by mechanical contact with the anode, and preferably by physical contact by e.g. welding.

The material for the cathode is preferably a material having alkali resistance. For example, nickel, Raney nickel, nickel sulfide, steel or stainless steel may be used. As the cathode, one or more flat plates or meshed sheets may be used in a single or a multi-layered structure. Otherwise, a three-dimensional electrode composed of linear electrodes, may also be employed. As the electrolytic cell, a two compartment type electrolytic cell comprising one anode compartment and one cathode compartment, may be employed. An electrolytic cell having three or more compartments combined may also be used. A plurality of electrolytic cells may be arranged in a monopolar structure or a bipolar structure.

As the diaphragm partitioning the anode compartment and the cathode compartment, it is preferred to employ a cation exchange membrane. The cation exchange membrane transports cations from the anode compartment to the cathode compartment, and prevents transfer of sulfide ions and polysulfide ions. As the cation exchange membrane, a high polymer membrane having cation exchange groups such as sulfonic acid groups or carboxylic acid groups introduced to a hydrocarbon type or fluororesin type polymer, is preferred. If there will be no problem with respect to e.g. alkali resistance, e.g. a bipolar membrane or an anion exchange membrane may also be used.

The temperature of the anode compartment is preferably within a range of from 70 to 110° C. If the temperature of the anode compartment is lower than 70° C., not only the cell voltage tends to be high, but also nickel is likely to undergo anode dissolution, and by-products are likely to form, such being undesirable. The upper limit of the temperature is practically limited by the material of the diaphragm or the electrolytic cell.

The anode potential is preferably maintained within such a range that polysulfide ions ($Sx^{2-}$) such as $S_2^{2-}$, $S_3^{2-}$, $S_4^{2-}$ and $S_5^{2-}$ will form as oxidation products of sulfide ions, and no thiosulfate ions will be produced as by-products. The operation is preferably carried out so that the anode potential is within a range of from −0.75 to +0.25 V. If the anode potential is lower than −0.75 V, no formation of polysulfide ions will substantially take place, such being undesirable. If the anode potential is higher than +0.25 V, not only by-products such as thiosulfite ions are likely to form, but also nickel may undergo anode dissolution, such being undesirable. In the present specification, the electrode potential is represented by a potential measured against a reference electrode of $Hg/Hg_2Cl_2$ in a saturated KCl solution at 25° C.

The anode to be used in the present invention is a three-dimensional electrode, whereby it is not easy to accurately measure the anode potential. Accordingly, it is industrially preferred to control the production conditions by regulating the cell voltage or the current density at the diaphragm area, rather than by regulating the potential. This electrolytic method is suitable for constant current electrolysis. However, it is possible to change the current density.

The solution containing sulfide ions to be introduced into the anode compartment, is treated by one pass or by recycling. However, it is preferred to produce a polysulfide cooking liquor of high concentration PS-S by one pass treatment. In the case of recycling treatment, not only the pump capacity tends to be unnecessarily large, but also the heat history of the polysulfide cooking liquor will increase, and PS-S tends to undergo thermal decomposition. In the present invention, as counter cations for the sulfide ions, alkali metal ions are preferred. As the alkali metal ions, preferred are sodium ions or potassium ions.

The method of the present invention is suitable particularly for a method for obtaining a polysulfide cooking liquor by treating white liquor or green liquor in a pulp production process. When a polysulfide production process of the present invention is combined in the pulp production process, at least a part of white liquor or green liquor is withdrawn and treated by the polysulfide production process of the present invention, and the treated liquor is supplied to a cooking process.

The composition of the white liquor usually contains from 2 to 6 mol/l of alkali metal ions in the case of white liquor used for current kraft pulp cooking, and at least 90% thereof is sodium ions, the rest being substantially potassium ions. Anions are mainly composed of hydroxide ions, sulfide ions and carbonate ions, and further include sulfate ions, thiosulfate ions, chlorine ions and sulfite ions. Further, very small amount components such as calcium, silicon, aluminum, phosphorus, magnesium, copper, manganese and iron, are contained.

On the other hand, the composition of the green liquor contains, whereas the white liquor contains sodium sulfide and sodium hydroxide as the main components, sodium sulfide and sodium carbonate as the main components. The other anions and very small amount components in the green liquor are as same as the white liquor.

When such white liquor or green liquor is supplied to the anode compartment and subjected to electrolytic oxidation according to the present invention, the sulfide ions are oxidized to form polysulfide ions. At the same time, alkali metal ions will be transported through the diaphragm to the cathode compartment.

To be used for the pulp cooking process, the PS-S concentration in the solution (polysulfide cooking liquor) obtained by electrolysis is preferably from 5 to 15 g/l, although it depends also on the sulfide ion concentration in the white liquor or the green liquor. If the PS-S concentration is less than 5 g/l, no adequate effect for increasing the yield of pulp by cooking may be obtained. If the PS-S concentration is higher than 15 g/l, $Na_2S$-state sulfur content tends to be small, whereby the yield of pulp will not increase, and thiosulfate ions tend to be produced as by-products during the electrolysis.

Further, if the average value of x of the polysulfide ions ($Sx^{2-}$) present exceeds 4, thiosulfate ions likewise tend to be formed as by-products during the electrolysis, and the anode dissolution of nickel is likely to take place. Accordingly, it is preferred to carry out the electrolysis operation so that the average value of x of the polysulfide ions in the cooking liquor will be at most 4, particularly at most 3.5. The conversion (degree of conversion) of the sulfide ions to PS-S is preferably from 15% to 75%, more preferably at most 72%.

The reaction in the cathode compartment may be selected variously. However, it is preferred to utilize a reaction to form hydrogen gas from water. An alkali hydroxide will be formed from the hydroxide ion formed as a result and the alkali metal ion transported from the anode compartment. The solution to be introduced into the cathode compartment is preferably a solution consisting essentially of water and an alkali metal hydroxide, particularly a solution consisting of water and hydroxide of sodium or potassium. The concentration of the alkali metal hydroxide is not particularly limited, but is from 1 to 15 mol/l, for example, and preferably from 2 to 5 mol/l. It is possible to prevent deposition of insolubles on the diaphragm if a solution having an ionic strength lower than the ionic strength of the white liquor passing though the anode compartment is used as the cathode solution, although such may depend on the particular case. The formed hydrogen gas may be used as fuel, or it may be used also as a starting material for hydrogen peroxide. The formed alkali hydroxide can be used for pulp cooking, and as the amount of impurities is particularly small, it can be used also for pulp bleaching.

EXAMPLE

Now, the present invention will be described in further detail with reference to Examples. However, it should be understood that the present invention is by no means restricted to such specific Examples.

Example 1

A two compartment electrolytic cell was assembled by using a nickel plate as an anode current collector, a nickel foam (Cellmet, tradename, manufactured by Sumitomo Electric Industries, Ltd., 100 mm×20 mm×4 mm) as an anode, a meshed Raney nickel electrode as a cathode, and a fluororesin type cation exchange membrane (Flemion, tradename, manufactured by Asahi Glass Co., Ltd.) as a diaphragm. The anode compartment had a height of 100 mm, a width of 20 mm and a thickness of 4 mm, the cathode compartment had a height of 100 mm, a width of 20 mm and a thickness of 5 mm, and the effective area of the diaphragm was 20 cm². The nickel foam used as the anode was bonded to the nickel plate as the anode current collector by electric welding. The electrolytic cell was assembled by pressing the diaphragm by the cathode from the cathode compartment side to the anode side.

The physical properties of the anode and the electrolysis conditions were as follows.

Thickness of anode compartment: 4 mm

Thickness of anode: 4 mm

Anode surface area per volume of anode compartment: 3125 $m^2/m^3$

Average pore size of pores: 0.83 mm

Surface area to diaphragm area: 12.5 $m^2/m^2$

Porosity of anode compartment: 95%

Anode solution superficial velocity: 3 cm/sec

Electrolysis temperature: 85° C.

Current density at diaphragm: 6 $kA/m^2$

As an anode solution, 1l of model white liquor ($Na_2S$: 16 g/l as calculated as sulfur atom, NaOH: 90 g/l, $Na_2CO_3$: 34 g/l) was prepared, and was circulated at a flow rate of 144 ml/min (superficial velocity: 3 cm/sec) by introducing it from the lower side of the anode compartment and withdrawing it from the upper side. 2l of a 3N:NaOH aqueous solution was used as a cathode solution, and it was circulated at a flow rate of 80 ml/min by introducing it from the lower side of the cathode compartment and withdrawing it from the upper side. Both anode side and cathode side were provided with heat exchangers, to increase the temperatures of the anode solution and the cathode solution, followed by introduction to the cell.

Constant current electrolysis was carried out at a current of 12 A (current density at the diaphragm: 6 $kA/m^2$) to prepare a polysulfide cooking liquor. At predetermined times, the cell voltage was measured, and the circulated liquid was sampled, whereupon PS-S, $Na_2S$-state sulfur and thiosulfate ions in the solution were quantitatively analyzed. The analyses were carried out in accordance with the methods disclosed in JP-A-7-92148.

The change with time in the measured value of the quantitatively analyzed values of the concentrations of various sulfur compounds and the cell voltage were as follows. After 30 minutes from the initiation of the electrolysis, the composition of the polysulfide cooking liquor was such that PS-S was 3.1 g/l, $Na_2S$-state sulfur was 12.2 g/l, and the increased thiosulfate ions were 0.19 g/l as calculated as sulfur atom. After 1 hour and 30 minutes from the initiation of the electrolysis, the composition of the polysulfide cooking liquor was such that PS-S was 10.4 g/l, $Na_2S$-state sulfur was 5.3 g/l, and the increased thiosulfate ions were 0.31 g/l as calculated as sulfur atom. The average value of x of the polysulfide ions ($Sx^{2-}$) was 2.9, the current efficiency during that time was 94%, and the selectivity was 97%.

Beyond 1 hour and 30 minutes, side reactions started to proceed gradually, the polysulfide ions ($Sx^{2-}$) decreased while maintaining the average value of x of about 3.6, and formation reaction of the thiosulfate ions proceeded. Then, after about 2 hours, the cell voltage suddenly increased, and nickel eluted. The cell voltage was stable at from 1.0 to 1.1 V from the initiation of the electrolysis for about 1 hour, and then the cell voltage gradually increased. It was 1.3 V after about 1 hour and 40 minutes when the thiosulfide ion concentration increased, and when 20 minutes have further passed, the elution reaction of nickel started to proceed. During the electrolysis operation, the pressure loss of the anode was 0.05 $kgf/cm^2/m$.

During the electrolysis operation, the products are polysulfide sulfur (PS-S) and thiosulfate ions alone except eluted nickel. Accordingly, the current efficiency and the selectivity are defined by the following formulae, wherein A (g/l) is the concentration of PS-S formed, and B (g/l) is the concentration of thiosulfate ions formed, as calculated as sulfur atom.

Current efficiency=[A/(A+2B)]×100%

Selectivity=[A/(A+B)]×100%

Examples 2 to 13

Constant current electrolysis was carried out in the same manner as in Example 1, by using the same model white liquor as in Example 1, by changing e.g. the anode surface area, the average pore size of the anode pores, porosity of the anode compartment, the anode solution superficial velocity, the current density at the diaphragm and the reaction temperature. The results of consideration from the viewpoint of (1) the change in the anode surface area, (2) the change in the superficial velocity of the anode solution, (3) the change in the current density, and (4) the change in the temperature in the electrolytic cell (reaction temperature), based on Examples, are as follows. Here, Examples used for the consideration with respect to (4) are not shown here.

In Examples, the elution reaction of the nickel foam was observed in some cases. The evaluation for the nickel elution was based on the following observation index.

X: Nickel eluted before the average value of x of the polysulfide ions ($Sx^{2-}$) became 2, or PS-S became 8 g/l.

○: Nickel eluted about when the average value of x of the polysulfide ions ($Sx^{2-}$) became 3.6, or about when the electrolysis reaction shifted from the PS-S formation reaction to the thiosulfate ion formation reaction.

◎: Nickel eluted after the electrolysis reaction shifted to the thiosulfate ion formation reaction, or nickel did not elute.

In Table 1, "initial cell voltage" represents a constant and stable voltage after the initiation of the electrolysis. Taking the above-mentioned Example 1 as an example, the cell voltage from the initiation of the electrolysis until about 1 hour, was constant and stable at from 1.0 to 1.1 V, and then gradually increased, and the initial cell voltage means such a constant and stable voltage.

(1) Evaluation by the Change in the Anode Surface Area:

Examples 2 to 7

Constant current electrolysis was carried out in the same manner as in Example 1, under conditions that the anode surface area per anode compartment was changed from 7000 $m^2/m^3$ to 625 $m^2/m^3$, among the conditions in Example 1. The conditions and the results are shown in Table 1. In Example 4, the anode surface area was the same as in Example 1, and the anode solution superficial velocity was 5 cm/sec, and in Example 5, the anode solution superficial velocity was 4 cm/sec. The porosity of the anode compartment was 95% in all cases. In Table 1, the unit for the anode pressure loss was "$kgf/cm^2/m$".

TABLE 1

| Examples | Anode surface area per anode compartment (m²/m³) | Average pore size of pores in anode (mm) | Anode surface area per diaphragm (m²/m²) | Evaluation for nickel elution | Anode pressure loss | Initial cell voltage (V) |
|---|---|---|---|---|---|---|
| 2 | 7000 | 0.51 | 28 | ◉ | 0.26 | 1.1 |
| 3 | 4625 | 0.64 | 18.5 | ○ | 0.18 | 1.15 |
| 4 | 3125 | 0.83 | 12.5 | ○ | 0.12 | 1.2 |
| 5 | 2000 | 0.83 | 8 | ○ | 0.08 | 1.2 |
| 6 | 1250 | 1.8 | 5 | ○ | 0.06 | 1.32 |
| 7 | 625 | 3 | 2.5 | X | 0.05 | 1.34 |

As shown in Examples 2 to 7 in Table 1, the larger the anode surface area, the lower the initial cell voltage and the longer the time until the nickel eluted. However, as the average pore size of the pores tended to be small, the pressure loss relatively increased. As in Example 5, even when the anode solution superficial velocity was 4 cm/s, no influence on the above tendency was confirmed. In Example 7, although nickel eluted before PS-S became 8 g/l, the anode pressure loss was as low as 0.05 kgf/cm²/m, and the initial cell voltage was at a level of 1.34 V, and such is applicable to the present invention.

(2) Evaluation by the Change in the Superficial Velocity of the Anode Solution:

Examples 2, 4 and 8 to 11

Constant current electrolysis was carried out in the same manner as in Example 1 under conditions that the superficial velocity of the anode solution was changed. The conditions and the results are shown in Table 2. In Table 2, both groups of the case where the anode surface area was 7000 m²/m³ (Examples 8, 2 and 9) and the case where it was 3125 m²/m³ (Examples 10, 4 and 11) are shown. Both the groups were carried out under the same conditions except the anode compartment superficial velocity. No significant difference in the initial cell voltage was confirmed between both the groups in any cases of the superficial velocity of 7.5 cm/sec, 5 cm/sec and 2.5 cm/sec, and both showed good results.

TABLE 2

| Examples | Anode surface area per anode compartment (m²/m³) | Superficial velocity in anode compartment (cm/s) | Evaluation for nickel elution | Anode pressure loss (kgf/cm²/m) | Initial cell voltage (V) |
|---|---|---|---|---|---|
| 8 | 7000 | 7.5 | ◉ | 0.42 | 1.1 |
| 2 | 7000 | 5 | ◉ | 0.26 | 1.1 |
| 9 | 7000 | 2.5 | ◉ | 0.12 | 1.1 |
| 10 | 3125 | 7.5 | ○ | 0.2 | 1.2 |
| 4 | 3125 | 5 | ○ | 0.12 | 1.2 |
| 11 | 3125 | 2.5 | ○ | 0.05 | 1.2 |

In the group of the anode surface area being 3125 m²/m³, it was shown that although nickel eluted slightly earlier, no nickel eluted until the electrolysis reaction shifted from the PS-S formation reaction to the thiosulfate ion formation reaction (evaluation: ○) Further, it was shown that a polysulfide cooking liquor having a high concentration can be produced at a low voltage even at a small superficial velocity of 2.5 cm/sec, and at the same time, by decreasing the superficial velocity i.e. the flow rate, an effect of decreasing the pressure loss can be obtained.

(3) Evaluation by the Change in the Current Density:

Examples 2 and 11 to 13

Constant current electrolysis was carried out in the same manner as in Example 1 under conditions that the current density per effective current-carrying area of the diaphragm was changed. The conditions and the results are shown in Table 3. In Table 3, Example 2 and Example 12, and Example 11 and Example 13, were carried out under the same conditions except the current density, respectively. With reference to Example 2 (current density: 6 kA/m²) and Example 12 (current density: 8 kA/m²), although a slight difference in the initial cell voltage was observed, good results were obtained with respect to the evaluation for nickel elution and the anode pressure loss. In the case of Example 11 and Example 13, although nickel eluted slightly earlier, no elution of nickel was shown until the electrolysis reaction shifted from the PS-S formation reaction to the thiosulfate ion formation reaction (evaluation: ○).

TABLE 3

| Examples | Anode surface area per anode compartment (m²/m³) | Superficial velocity in anode compartment (cm/s) | Current density at diaphragm (kA/m²) | Evaluation for nickel elution | Anode pressure loss (kgf/cm²m) | Initial cell voltage (V) |
|---|---|---|---|---|---|---|
| 2 | 7000 | 5 | 6 | ◉ | 0.26 | 1.1 |
| 12 | 7000 | 5 | 8 | ◉ | 0.26 | 1.35 |
| 11 | 3125 | 2.5 | 6 | ○ | 0.05 | 1.2 |
| 13 | 3125 | 2.5 | 8 | ○ | 0.05 | 1.42 |

(4) Evaluation by the Change in the Temperature in the Electrolytic Cell (Reaction Temperature):

Examples 14 to 16

Constant current electrolysis was carried out under the same conditions as in Example 2 except that the temperature in the electrolytic cell (reaction temperature) was changed to 70° C. (Example 14), 80° C. (Example 15) or 90° C. (Example 16). The anode pressure loss was 0.26 kgf/cm²/m in all cases, and the initial cell voltage was 1.3 V, 1.2 V and 1.1 V, respectively, and good results were obtained in all cases. With respect to the evaluation for nickel elution, Example 14 was rated as ○, and Example 15 and Example 16 were rated as ◉.

As mentioned above, Examples 2 to 16 were explained. In all cases except Example 7, a polysulfide cooking liquor having a high concentration of PS-S concentration at a level of 11 g/l, was obtained, at a high current efficiency at a level of 95% as in Example 1. Further, the pressure loss was small, and the elution of nickel could be suppressed. With respect to the polysulfide ions ($Sx^{2-}$), when the average value of x became at a level of from 3.5 to 4, polysulfide ions decreased while maintaining the average value, and the formation reaction of thiosulfate ions proceeded.

COMPARATIVE EXAMPLE

A carbon felt having a thickness of 6 mm was packed in the anode compartment (thickness: 4 mm) of the electrolytic cell used in Example 1 (thickness of the carbon felt as packed was 4 mm). The physical properties of the anode as packed in the anode compartment were as follows.

Diameter of carbon fibers: 12 μm
Surface area to diaphragm area: 158 m²/m²
Weight to diaphragm area: 698 g/m²
Porosity: 89%

The same model white liquor as used in Example 1 was employed, and constant current electrolysis was carried out under the same conditions as in Example 1 except that the current was 12 A (6 kA/m²) and circulation was carried out at a flow rate of the anode solution of 96 ml/min (superficial velocity: 2 cm/sec). As a result, a polysulfide cooking liquor having a PS-S concentration at a level of 11 g/l could be obtained with a current efficient of about 90%. Then, about when the average value of x of the polysulfide ions ($Sx^{2-}$) reached the level of from 3.5 to 4, the polysulfide ions decreased while maintaining the average value of x, and the formation reaction of thiosulfate ions proceeded. The initial cell voltage was at a level of 1.3 V, and further increased about when the thiosulfate ions were formed. The pressure loss of the anode was so high as 0.6 kgf/cm²/m.

INDUSTRIAL APPLICABILITY

According to the present invention, a cooking liquor containing polysulfide ions at a high concentration can be produced while keeping a high selectivity, with very little production of thiosulfate ions as a by-product, and by using the polysulfide cooking liquor thus obtained for cooking, the yield of pulp can be effectively increased. Further, the anode is not an integrated body of fibers, but has a physically continuous network structure, and it can further decrease the cell voltage, whereby the operation cost can be suppressed. Further, since the anode to be used in the present invention has excellent electrical conductivity, the porosity of the anode can be made high, and the pressure loss can be made small. Further, clogging of suspended solid matters in the electrode can be suppressed.

What is claimed is:

1. A method for producing polysulfides, which comprises introducing a solution containing sulfide ions into an anode compartment of an electrolytic cell comprising the anode compartment provided with a porous anode, a cathode compartment provided with a cathode and a diaphragm partitioning the anode compartment and the cathode compartment, for electrolytic oxidation to obtain polysulfide ions, wherein at least the surface of said anode consists essentially of nickel or an alloy containing nickel in an amount of at least 50 wt %, the porous anode has a physically continuous three-dimensional network structure, and the surface area of the anode per unit volume of the anode compartment is from 500 to 20,000 m²/m².

2. The method of claim 1, wherein said porous anode is made of nickel.

3. The method for producing polysulfides according to claim 1, wherein pores in the network structure have an average pore size of from 0.1 mm to 5 mm.

4. The method of claim 3, wherein said porous anode is made of nickel.

5. The method for producing polysulfides according to claim 1, wherein the surface area of the above-mentioned anode is from 2 to 100 m²/m² per effective current-carrying area of the diaphragm.

6. The method of claim 5, wherein said porous anode is made of nickel.

7. The method for producing polysulfides according to claim 1, wherein the above-mentioned anode is disposed in the anode compartment so that the porosity is from 90 to 99%.

8. The method of claim 7, wherein said porous anode is made of nickel.

9. The method for producing polysulfides according to claim 1, wherein the current density in the electrolytic oxidation is from 0.5 to 20 kA/m² per effective current-carrying area of the diaphragm.

10. The method of claim 9, wherein said porous anode is made of nickel.

11. The method for producing polysulfides according to claim 1 wherein said solution containing sulfide ions is made to pass through the anode compartment at an average superficial velocity of from 1 to 30 cm/sec.

12. The method of claim 11, wherein said porous anode is made of nickel.

13. The method for producing polysulfides according to claim 11, wherein said diaphragm is a fluororesin type cation exchange membrane.

14. The method of claim 13, wherein said porous anode is made of nickel.

15. The method for producing polysulfides according to claim 13, wherein the solution containing sulfur ions is made to pass through the above-mentioned anode compartment by one pass.

16. The method of claim 15, wherein said porous anode is made of nickel.

17. The method for producing polysulfides according to claim 15, wherein the above-mentioned solution containing sulfur ions is white liquor or green liquor in a pulp production process.

18. The method of claim 17, wherein said porous anode is made of nickel.

* * * * *